United States Patent
Moon et al.

(10) Patent No.: US 8,396,068 B2
(45) Date of Patent: Mar. 12, 2013

(54) METHOD FOR TRANSMITTING DATA IN WIRELESS COMMUNICATION SYSTEM

(75) Inventors: Seong Ho Moon, Anyang-si (KR); Ki Ho Nam, Anyang-si (KR); Seung Hee Han, Anyang-si (KR); Min Seok Noh, Anyang-si (KR); Jin Sam Kwak, Anyang-si (KR); Hyun Woo Lee, Anyang-si (KR); Dong Cheol Kim, Anyang-si (TW); Sung Gu Cho, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 12/745,803

(22) PCT Filed: Dec. 17, 2008

(86) PCT No.: PCT/KR2008/007471
§ 371 (c)(1),
(2), (4) Date: Jun. 2, 2010

(87) PCT Pub. No.: WO2009/082120
PCT Pub. Date: Jul. 2, 2009

(65) Prior Publication Data
US 2010/0260164 A1 Oct. 14, 2010

Related U.S. Application Data

(60) Provisional application No. 61/015,640, filed on Dec. 20, 2007, provisional application No. 61/021,040, filed on Jan. 15, 2008, provisional application No. 61/021,622, filed on Jan. 16, 2008.

(30) Foreign Application Priority Data

Apr. 25, 2008 (KR) .................. 10-2008-0038813

(51) Int. Cl.
*H04L 12/28* (2006.01)
(52) U.S. Cl. .................. 370/395.4; 370/230; 370/330
(58) Field of Classification Search .................. 370/230, 370/235, 252, 314, 321, 330, 336, 337, 347, 370/376, 395.4, 442, 458, 468
See application file for complete search history.

(56) References Cited

U.S. PATENT DOCUMENTS

| | | | |
|---|---|---|---|
| 5,274,311 A | 12/1993 | Littlejohn et al. | |
| 6,765,887 B1 * | 7/2004 | Shiu et al. | 370/329 |
| 7,215,715 B2 | 5/2007 | Chini et al. | |
| 7,715,842 B2 | 5/2010 | Kim et al. | |
| 7,848,295 B2 | 12/2010 | Kang et al. | |
| 7,873,010 B2 * | 1/2011 | Love et al. | 370/330 |
| 7,885,214 B2 * | 2/2011 | Ahmadi et al. | 370/295 |

(Continued)

OTHER PUBLICATIONS

Kim et al., "A TDD-OFDMA Framework for Next Generation Mobile Communication", IEEE 64th Vehicular Technology Conference, Sep. 25-28, 2006, pp. 1-5.

(Continued)

*Primary Examiner* — Kwang B Yao
*Assistant Examiner* — Nguyen Ngo
(74) *Attorney, Agent, or Firm* — Birch, Stewart, Kolasch & Birch, LLP (57) ABSTRACT

A method for transmitting data in a wireless communication system is provided. The method includes: transmitting first data through a radio resource allocated in a unit of a default transmission time interval (TTI) including at least one sub-frame in a frame including a plurality of sub-frames consisting of a plurality of orthogonal frequency division multiplexing (OFDM) symbols; and transmitting second data through a radio resource allocated in a unit of a modified TTI obtained by changing the number of sub-frames included in the default TTI in the frame.

10 Claims, 4 Drawing Sheets

⬚ Radio Frame Based Control Region
▨ Frame Based Control Region
▦ Sub-Frame Based Control Region
▧ Modified TTI block (Multi TTI or partial TTI)

U.S. PATENT DOCUMENTS

| | | |
|---|---|---|
| 7,925,267 B2 | 4/2011 | Jung et al. |
| 2005/0213556 A1 | 9/2005 | Wax et al. |
| 2007/0058595 A1 | 3/2007 | Classon et al. |
| 2007/0087767 A1* | 4/2007 | Pareek et al. .................. 455/502 |
| 2007/0097905 A1 | 5/2007 | Suh et al. |
| 2007/0104129 A1* | 5/2007 | Yang et al. .................... 370/329 |
| 2007/0286066 A1 | 12/2007 | Zhang et al. |
| 2008/0095195 A1 | 4/2008 | Ahmadi et al. |
| 2008/0107073 A1 | 5/2008 | Hart et al. |
| 2008/0232284 A1* | 9/2008 | Dalsgaard et al. ............ 370/310 |
| 2008/0310388 A1* | 12/2008 | Aghili et al. .................. 370/345 |
| 2009/0016371 A1 | 1/2009 | Zheng et al. |
| 2009/0086686 A1* | 4/2009 | Rudolf et al. ................. 370/336 |
| 2009/0103497 A1* | 4/2009 | Fernandez-Corbaton et al. ............................. 370/335 |

OTHER PUBLICATIONS

Shin et al., "The Performance Comparison between WiBro and HSDPA", 2nd International Symposium on Wireless Communication Systems, Sep. 7, 2005, pp. 346-350.

* cited by examiner

METHOD FOR TRANSMITTING DATA IN WIRELESS COMMUNICATION SYSTEM

CROSS REFERENCE TO RELATED APPLICATIONS

This application is the National Phase of PCT/KR2008/007471 filed on Dec. 17, 2008 which claims priority under 35 U.S.C 119(e) of U.S. Provisional Application Nos. 61/015,640 filed on Dec. 20, 2007, 61/021,040 filed on Jan. 15, 2008 and 61/021,622 filed Jan. 16, 2008 and under 35 U.S.C 119(a) to Patent Application No. 10-2008-0038813 filed in Republic of Korea on Apr. 25, 2008. The entire contents of all of the above applications are hereby incorporated by reference into the present application.

TECHNICAL FIELD

The present invention relates to wireless communications, and more particularly, to a method for transmitting data by using a frame including a various-sized transmission time interval (TTI) that is a basic unit of scheduling.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, standardization on the IEEE 802.16m is in progress as a new technical standard based on the IEEE 802.16e. The IEEE 802.16m, which is a newly developed technical standard, has to be designed to support the previously designed IEEE 802.16e. That is, a technology (i.e., IEEE 802.16m) of a newly designed system has to be configured to operate by effectively incorporating a conventional technology (i.e., IEEE 802.16e). This is called backward compatibility. The backward compatibility considered in the design of IEEE 802.16m is as follows.

First, a new user equipment (UE) employing a new technology has to operate with the same performance as a legacy UE employing a conventional technology with a legacy base station (BS). Second, a new system has to operate in the same radio frequency (RF) subcarrier and the same bandwidth as those of a legacy system. Third, a new BS has to support a case where a new UE and a legacy UE coexist in the same RF subcarrier, and overall system performance has to be improved by a ratio of the new UE. Fourth, a new BS has to support a handover of a legacy UE and a handover of the new UE such that their handover performances conform to those of legacy BSs. Fifth, a new BS has to support both a UE and a legacy UE to the same level as that supported by a legacy BS to the legacy UE.

A BS performs scheduling to allocate radio resources to a UE. The scheduling is performed in a medium access control (MAC) layer which is an upper layer of a physical layer for transmitting data through a radio channel. A transmission time interval (TTI) is a basic unit of scheduling performed in the MAC layer. The TTI may be a unit of radio resource allocation. Control information on radio resource allocation can be transmitted together for each TTI transmitted in the physical layer. In general, a TTI size is determined by considering a size of transmission data, a data transmission latency in hybrid automatic repeat request (HARQ), an overhead caused by control information, etc. For example, if the TTI size is set to be less than a data transfer block, a transfer block segmentation process has to be performed in the MAC layer, which results in an overhead in performance of the MAC layer. In addition, latency and complexity may increase in a transmission process since the data transfer block is transmitted through a plurality of TTIs. On the other hand, if the TTI size is set to be significantly larger than the data transfer block, the number of data transfer blocks to be multiplexed to one TTI increases. Accordingly, control information is additionally required for the multiplexed data transfer block, thereby increasing an overhead caused by the control information.

When the TTI size is fixed to one size with respect to various-sized data, a problem may arise in that latency and complexity increase in the transmission process or an overhead caused by the control information increases. For example, a normal data packet of internet Protocol (IP) traffic has a size of approximately 500 bytes, and a voice packet of a voice over IP (VoIP) service has a size of approximately 30 to 40 bytes. In addition, since the IEEE 802.16m system has to provide more various types of data services while satisfying a backward compatibility with the IEEE 802.16e system, the use of the TTI whose size is fixed to one size cannot satisfy the various types of data services.

Accordingly, there is a need for a method capable of adaptively employing a TTI to satisfy various types of data services.

DISCLOSURE OF INVENTION

Technical Problem

The present invention provides a method for transmitting data by using a frame employing a various-sized transmission time interval (TTI).

Technical Solution

In an aspect, a method for transmitting data in a wireless communication system includes transmitting first data through a radio resource allocated in a unit of a default transmission time interval (TTI) including at least one sub-frame in a frame including a plurality of sub-frames consisting of a plurality of orthogonal frequency division multiplexing (OFDM) symbols, and transmitting second data through a radio resource allocated in a unit of a modified TTI obtained by changing the number of sub-frames included in the default TTI in the frame.

In another aspect, a method for transmitting data in a wireless communication system includes transmitting first data through a first region assigned within a frame for a first system, and transmitting second data through a second region assigned within the frame for a second system, wherein a various-sized TTI that is a basic unit of scheduling is assigned to at least one of the first region and the second region.

Advantageous Effects

Data transfer efficiency can be increased since a suitable-sized transmission time interval (TTI) can be assigned to various types of data in one frame.

MODE FOR THE INVENTION

Figure 1:
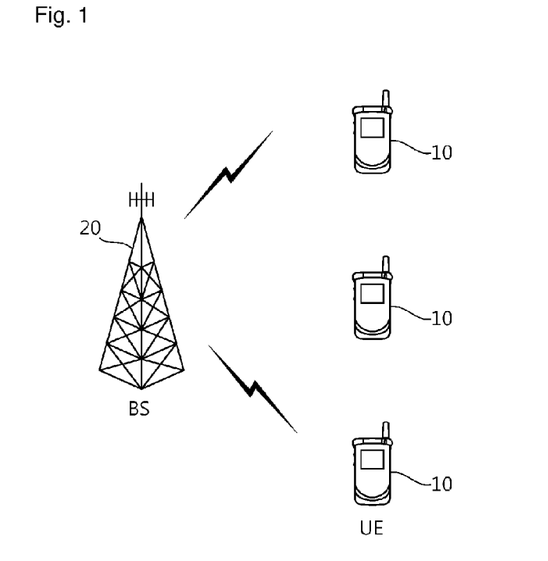
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink represents a communication link from the BS 20 to the UE 10, and an uplink represents a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

There is no restriction on multiple access schemes used in the wireless communication system. Various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

Figure 2:
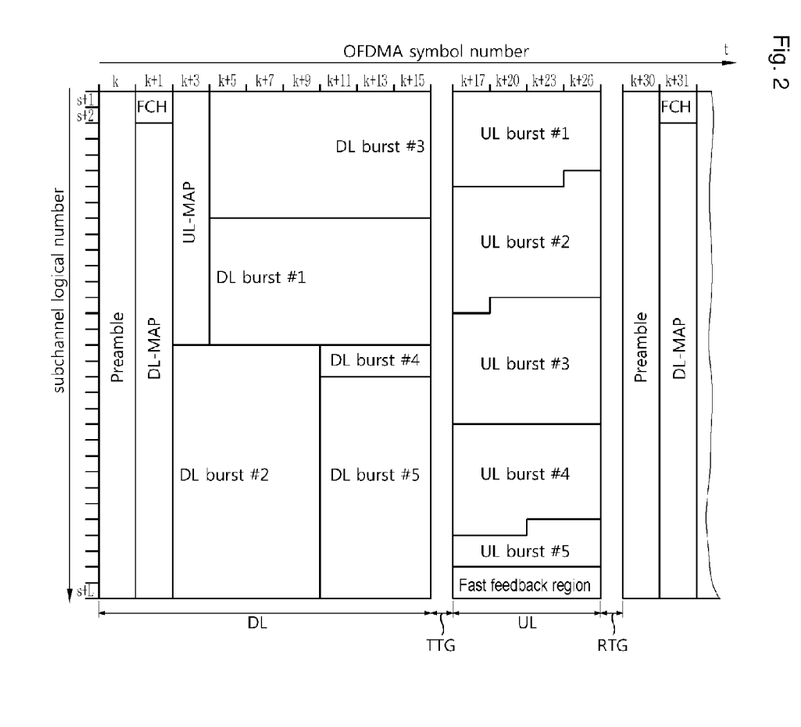
FIG. 2 shows an example of a frame structure.

FIG. 2 shows an example of a frame structure. A frame is a data sequence used according to a physical specification in a fixed time duration. This may be found in section 8.4.4.2 of the "Part 16: Air Interface for Fixed Broadband Wireless Access Systems" in the institute of electrical and electronics engineers (IEEE) standard 802.16-2004 (hereinafter, Document 1).

Referring to FIG. 2, the frame includes a downlink (DL) frame and an uplink (UL) frame. In a time division duplexing (TDD) scheme, UL and DL transmissions are achieved at different time points but share the same frequency band. The DL frame is temporally prior to the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes a UL burst profile. The UL burst profile indicates characteristics of a UL physical channel and is periodically transmitted by the BS by using a UCD message.

Hereinafter, a slot is a minimum unit of possible data allocation, and is defined with a time and a subchannel. The number of subchannels depends on a fast Fourier transform (FFT) size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers. A segment denotes at least one subchannel set.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. This is called permutation. Examples of the permutation rule employed in the Document 1 above include FUSC, PUSC, optional-FUSC (O-FUSC), optional-PUSC (O-PUSC), adaptive modulation and coding (AMC), etc. A set of orthogonal frequency division multiplexing (OFDM) symbols using the same permutation rule is referred to as a permutation zone. One frame includes at least one permutation zone.

The FUSC and the O-FUSC are used only in downlink transmission. The FUSC consists of one segment including all subchannel groups. Each subchannel is mapped to a physical subcarrier distributed over the entire physical channel. This mapping varies for each OFDM symbol. A slot consists of one subchannel on one OFDM symbol. The O-FUSC uses a pilot assignment scheme different from that used in the FUSC.

The PUSC is used both in downlink transmission and uplink transmission. In downlink, each physical channel is divided into clusters, each of which includes 14 contiguous subcarriers on two OFDM symbols. The physical channel is mapped to six groups. In each group, pilots are allocated in fixed positions to each cluster. In uplink, subcarriers are divided into tiles, each of which includes four contiguous physical subcarriers on three OFDM symbols. The subchannel includes six tiles. Pilots are allocated to the corners of each tile. The O-PUSC is used only in uplink transmission. Each tile includes three contiguous physical subcarriers on three OFDM symbols. Pilots are allocated to the center of each tile.

Now, a frame satisfying a backward compatibility with a legacy system and employing a various-sized transmission time interval (TTI) will be described. The frame satisfying the backward compatibility with the legacy system is referred to as a duplex frame. The duplex frame includes a resource region supporting the legacy system and a resource region supporting a new system/evolution system. The legacy system may be an IEEE 802.16e system. The new system may be an IEEE 802.16m system. Terminologies used in the IEEE 802.16e frame structure described in FIG. 2 can also be used with the same definition or with a partially modified definition in an IEEE 802.16m frame structure.

The frame employing a various-sized TTI will be first described, and then the duplex frame will be described.

Figure 3:
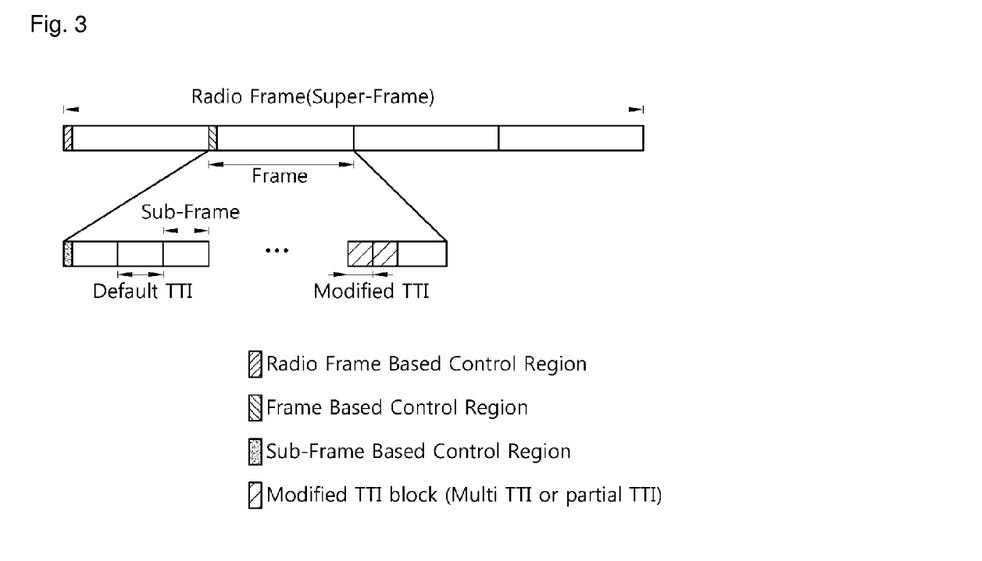
FIG. 3 shows a hierarchical frame structure according to an embodiment of the present invention.

FIG. 3 shows a hierarchical frame structure according to an embodiment of the present invention. This may represent a frequency-time physical resource.

Referring to FIG. 3, the hierarchical frame structure consists of a radio frame (or a super-frame), a frame, and a sub-frame. The radio frame includes at least one frame. The frame includes at least one sub-frame.

The radio frame includes at least one radio frame based control region. The radio frame based control region is referred to as a first control region. The first control region may be assigned to a first frame among a plurality of frames included in the radio frame. A common control channel may be assigned to the first control region. The common control channel is used to transmit information regarding frames constituting the radio frame or control information (e.g., system information) that can be commonly utilized by all UEs. The system information is necessary information which must be known to the UEs to communicate with a BS. The BS periodically transmits the system information. The system information can be periodically transmitted in every 20~40 milliseconds (ms). A size of the radio frame can be determined by considering a transmission period of the system information.

Meanwhile, a period of persistent scheduling is approximately 20 ms in a voice over Internet protocol (VoIP) service. In the persistent scheduling, a radio resource allocated in one frame (or sub-frame) is also allocated in a temporally subsequent frame (or sub-frame). The persistent scheduling can reduce an overhead caused by transmission of scheduling information since scheduling performed once is persistently applied to a plurality of frames (or sub-frames). Considering the transmission period of system information and the scheduling period of the VoIP service, the size of the radio frame is preferably set to 20 ms. However, the size of the radio frame is not limited thereto, and thus the size of the radio frame can be set to various sizes by considering several conditions of a communication system.

A frame is one unit of transmission and can be defined as an interval between preambles. The frame includes at least one sub-frame, and can include a plurality of TTIs each having a different size. The TTI is a basic unit of scheduling performed in a medium access control (MAC) layer. The TTI may be a unit of radio resource allocation. One frame may include a default TTI for a transfer block having a normal size and a modified TTI. The modified TTI includes a partial TTI for a transfer block having a small size such as a voice packet and a multi TTI for data having a larger size than a normal transfer block. That is, a radio resource can be allocated in a default TTI unit or a modified TTI unit within a frame, and one transfer block can be transmitted through a radio resource allocated in the default TTI unit while another transfer block can be transmitted through a radio resource allocated in the modified TTI unit.

A frame based control region may be included in the frame. The frame based control region is referred to herein as a second control region. Information on a plurality of frames included in a preamble or a frame is included in the second control region. The second control region may be assigned to all or any one of a plurality of frames included in the radio frame. The modified TTI may be assigned within a specific region predetermined for the modified TTI in the frame. A position of the specific region for the modified TTI and configuration information of the modified TTI may be reported through the second control region. A size of the frame may be set to 5 ms by considering a backward compatibility with an IEEE 802.16e frame having a size of 5 ms.

A sub-frame is a minimum unit of constituting the frame, and can be defined as a plurality of OFDM symbols. The sub-frame is a basic unit of constituting a TTI. One TTI includes at least one sub-frame. The sub-frame may be a unit of distinguishing a DL frame and a UL frame in a time division duplex (TDD) scheme in which the DL frame and the UL frame are temporally divided. When a first resource region for a legacy system and a second resource region for a new system coexist in one frame, the sub-frame may be a unit of distinguishing the first resource region and the second resource region.

A sub-frame based control region may be included in the sub-frame. The sub-frame based control region is referred to herein as a third control region. Radio resource allocation information on the sub-frame or the TTI is included in the third control region. A dedicated control channel may be assigned to the third control region. The dedicated control channel is used to transmit radio resource allocation information regarding a specific UE or control information (system configuration information, etc.) required by the specific UE. The third control region may be assigned to all subframes included in the frame or may be assigned to each TTI one by one.

To determine a suitable granularity of a sub-frame defined as a plurality of OFDM symbols, the number of OFDM symbols that can support the legacy system needs to be taken into account. In addition thereto, the granularity of the sub-frame is defined by considering various factors, such as a flexibility of downlink and uplink radio resource allocation in the TDD scheme, a numerology for unicast and multicast transmission, maintaining a generality of TDD and frequency division duplex (FDD) frame structures, a downlink and uplink granularity in the frame, etc. In the IEEE 802.16e frame, the number of OFDM symbols of the UL frame is a multiple of 3, and uplink sub-channelization is achieved based on 3 OFDM symbols. The sub-frame may be defined as 3 OFDM symbols or 6 OFDM symbols or 12 OFDM symbols to support the legacy system and the generality of the TDD and FDD frame structures. Meanwhile, when a cyclic prefix (CP) size is modified or a system bandwidth is modified, a subframe defined as 5 or 7 OFDM symbols may exist.

For convenience of explanation, it is assumed hereinafter that the sub-frame has a size of 3 OFDM symbols. However, the present invention is not limited thereto, and thus the sub-frame may be defined to have various sizes such as 4 OFDM symbols, 6 OFDM symbols, 8 OFDM symbols, 12 OFDM symbols, etc. When the sub-frame is defined as 3 OFDM symbols, a TTI having a size of 6 OFDM symbols is referred to as a default TTI, a TTI having a size of 3 OFDM symbols is referred to a partial TTI, and a TTI having a size of 12 OFDM symbols is referred to a multi-TTI. If a basic subframe consists of odd-numbered OFDM symbols, only the multi-TTI can be taken into account.

Figure 4:
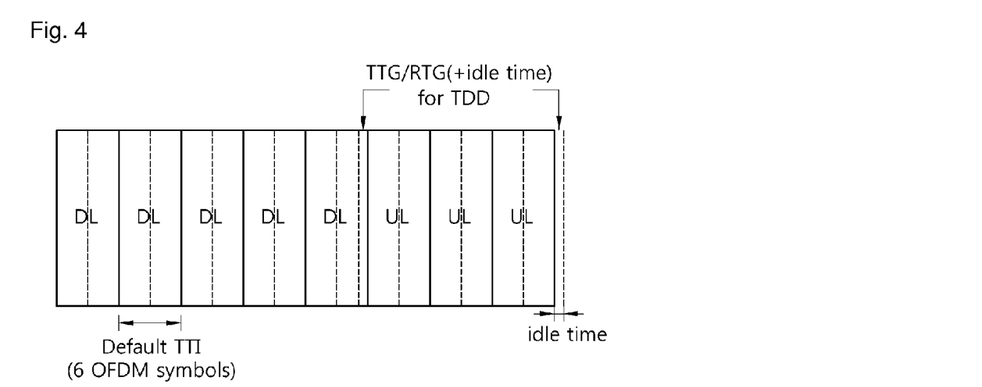
FIG. 4 shows an example of a basic frame structure.

FIG. 4 shows an example of a basic frame structure.

Referring to FIG. 4, a TDD frame includes 48 OFDM symbols. The frame consists of 8 default TTIs, and each default TTI has a size of 6 OFDM symbols. A transmit/receive transition gap (TTG) is located between a DL region and a UL region. A receive/transmit transition gap (RTG) is located between the UL frame and its subsequent frame. An idle time may be included in the TTG or the RTG according to a size of a cyclic prefix (CP) to avoid inter-symbol interference. Although the TDD frame is shown herein, the frame may be an FDD frame in which the DL region and the UL region are divided in a frequency domain. The default TTI having a size of 6 OFDM symbols can also be used in the FDD frame.

Table 1 shows parameters for the frame. The parameters can be applied to an IEEE 802.16m frame.

TABLE 1

| Transmission Bandwidth(MHz) | | 5 | 10 | 20 |
|---|---|---|---|---|
| Sampling Frequency(MHz) | | 5.6 | 11.2 | 22.4 |
| FFT Size | | 512 | 1024 | 2048 |
| Sub-carrier Spacing(kHz) | | 10.94 | 10.94 | 10.94 |
| Tu(us) | | 91.4 | 91.4 | 91.4 |
| usage | Cyclic Prefix (CP) | Ts(us) | OFDM symbols per Frame | Idle time(us) |
| Legacy Support Mode/16m Dedicated MBS | ⅛ Tu | 91.4 + 11.42 = 102.82 | 48 | 64.64 |
| Legacy Support Disabled 16m Mode | 1/16 Tu | 91.4 + 5.71 = 97.11 | 51 | 47.39 |

To satisfy a backward compatibility with a frame of the legacy system (i.e., IEEE 802.16e), a transmission bandwidth, a sampling frequency, an FFT size, a sub-carrier spacing, etc., of the new system may conform to the parameters of the IEEE 802.16e frame. In addition, in a legacy support mode for supporting the IEEE 802.16e, a CP length may be determined to be ⅛ of an OFDM symbol, and one frame may be determined to include 48 OFDM symbols. The CP length corresponding to ⅛ of the OFDM symbols is unnecessarily long when a delay spread is considered in a current channel model. Therefore, the CP length needs to be decreased. In a legacy support disabled mode, a new CP length may be determined to be 1/16 of the OFDM symbol, and one frame may include 51 OFDM symbols. In this case, among the 51 OFDM symbols, first three OFDM symbols of the frame may be used for a preamble, a midamble, a DL/UL control region, a feedback channel, a sounding channel, etc. Alternatively, one of the 3 OFDM symbols may be used for the TTG or RTG with an idle time. Alternatively, one of the 3 OFDM symbols may be used for the TTG or RTG with the idle time and the remaining 2 OFDM symbols may be respectively appended to a basic sub-frame so as to configure a sub-frame consisting of 7 OFDM symbols. The parameters of Table 1 can be applied to a frame to be described hereinafter. However, the present invention is not limited thereto, and thus the parameters may have various values.

Figure 5:
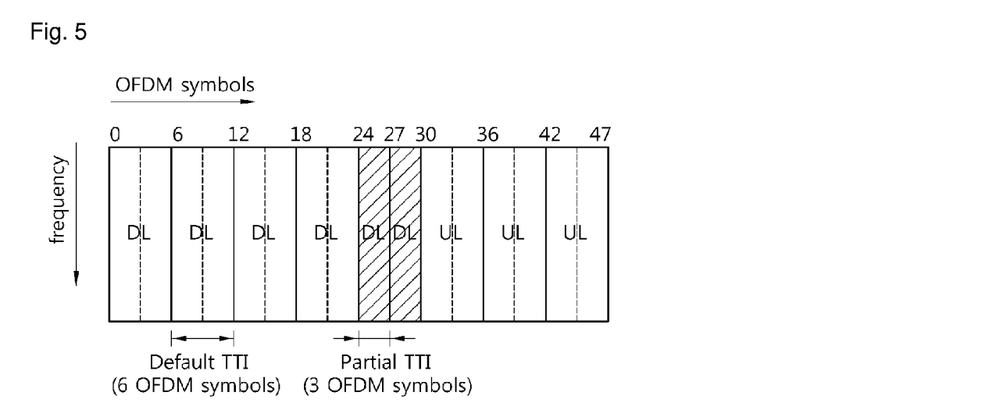
FIG. 5 shows a frame employing a various-sized transmission time interval (TTI) according to an embodiment of the present invention.

FIG. 5 shows a frame employing a various-sized TTI according to an embodiment of the present invention.

Referring to FIG. 5, a TDD frame includes 48 OFDM symbols. Herein, the frame includes a default TTI (i.e., 6 OFDM symbols) and a partial TTI (i.e., 3 OFDM symbols).

The partial TTI has a size corresponding to 1/n of the default TTI (where n is an integer satisfying n>1). To maintain an operation period of the default TTI when a data transfer block is processed in a MAC layer, the number of partial TTIs assigned within one frame corresponds to an integer multiple of n. A plurality of partial TTIs may be consecutively assigned without being separated. By doing so, control information on a partial TTI can be assigned to a TTI located in a preceding position, and its subsequent partial TTI can share the previously assigned control information without having to use additional control information. That is, persistent scheduling can be performed on the partial TTI.

The partial TTI is assigned to a temporally posterior portion of a DL region or a UL region within the TDD frame. For example, in the TDD frame in which the DL region is temporally prior to the UL region, the partial TTI for the downlink is assigned to OFDM symbols located in a posterior portion of the DL region, and the UL region follows the partial TTI. By locating the partial TTI in the posterior portion of the DL region or the UL region, a latency of a response signal (i.e., acknowledgment (ACK)/negative-acknowledgment (NACK) signal) for data transmission can be minimized in the TDD scheme. For example, when a time required by a UE for demodulating and decoding data transmitted through the DL region is 3 default TTIs, an ACK/NACK signal for data transmitted through 0 to 23 OFDM symbols can be received through 30 to 47 OFDM symbols. However, the latency of the ACK/NACK signal occurs since the ACK/NACK signal for data transmitted through the 24 to 29 OFDM symbols is received through a UL region of a next frame. The partial TTI can be located in a position of an OFDM symbol at which the latency of the ACK/NACK signal may occur, and a VoIP service that is insensitive to the latency of the ACK/NACK signal can be supported through the partial TTI.

The position and number of partial TTIs included in the frame may vary for each frame. A control region for control information may be assigned to the frame. The control information may be used to report information regarding the position and number of partial TTIs included in the frame.

Although a case where the default TTI and the partial TTI are included in the TDD frame has been described above, the frame may include the multi TTI and the default TTI, and the default TTI subsequent to the multi TTI may be assigned to a temporally posterior portion of the DL region or the UL region. A TTI configuration may be modified in a frame unit such that one frame consists of a modulated TTI and a next frame consists of a default TTI. The default TTI and the modified TTI may be assigned together in the DL region or the UL region not only in the TDD frame but also in the FDD frame.

Figure 6:
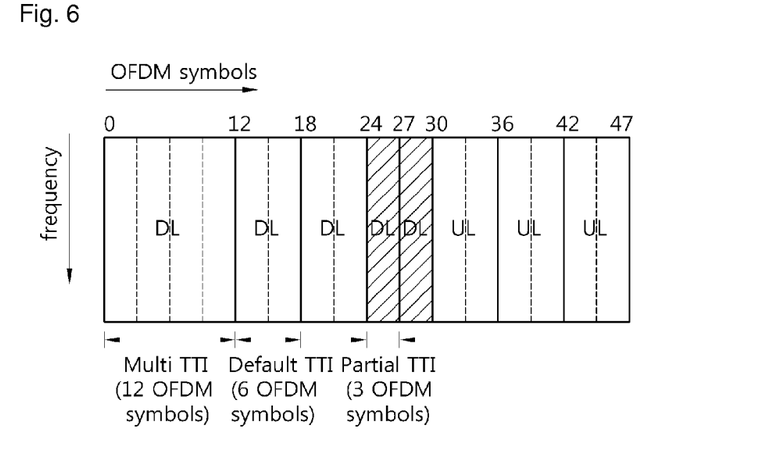
FIG. 6 shows a frame employing a various-sized TTI according to another embodiment of the present invention.

FIG. 6 shows a frame employing a various-sized TTI according to another embodiment of the present invention.

Referring to FIG. 6, a multi TTI (i.e., 12 OFDM symbols), a default TTI (i.e., 6 OFDM symbols), and a partial TTI (i.e., 3 OFDM symbols) are included in a TDD frame including 48 OFDM symbols.

The multi TTI has a size of an m-multiple of the default TTI (where m is an integer satisfying m>1). The multi TTI may be first assigned in a time domain within the frame, and thereafter the default TTI may be assigned, followed by the partial TTI. In case of the multi TTI, if sub-frames each having a different size exist within the frame, a size of the multi TTI may be not an m-multiple of the default TTI but a sum of frames each having a different size. A relatively large-sized data transfer block is assigned to the multi TTI, and thus an ACK/NACK signal may be more frequently transmitted than a normal data transfer block. Therefore, to minimize a latency of the ACK/NACK signal, the multi TTI may be assigned preferentially to the default TTI or the partial TTI. However, the multi TTI, the default TTI, and the partial TTI included in the frame do not have a fixed position or order. Information regarding assignment or non-assignment of each TTI, the position and number of TTIs, etc., may be reported through a control region assigned to the frame.

Now, the duplex frame satisfying a backward compatibility with the legacy system will be described. Hereinafter, for convenience of explanation, any entity related to the legacy system is named using a prefix of '$1^{st}$', and any entity related to the new system is named using a prefix of '$2^{nd}$'. The legacy system is referred to as a $1^{st}$ system. The new system is referred to as a $2^{nd}$ system. A UE that can use a service of the $1^{st}$ system is referred to as a $1^{st}$ UE. A UE that can use a service of the $2^{nd}$ system is referred to a $2^{nd}$ UE. A BS that provides the service of the $1^{st}$ system is referred to as a $1^{st}$ BS. A BS that provides the services of the $1^{st}$ system and the $2^{nd}$ system is referred to as a $2^{nd}$ BS. The $2^{nd}$ UE can use not only the service of the $2^{nd}$ system but also the service of the $1^{st}$ system, while the $1^{st}$ UE may not be able to use the service of the $2^{nd}$ system. That is, the $2^{nd}$ UE can decode all resource regions in a duplex frame structure, while the $1^{st}$ UE can decode radio resources limited to a first frame. A legacy only mode is a mode in which only the service of the $1^{st}$ system is provided. A legacy disabled mode is a mode in which only the service of the $2^{nd}$ system is provided. A legacy support mode is a mode in which both the services of the $1^{st}$ system and the $2^{nd}$ system are provided.

Figure 7:
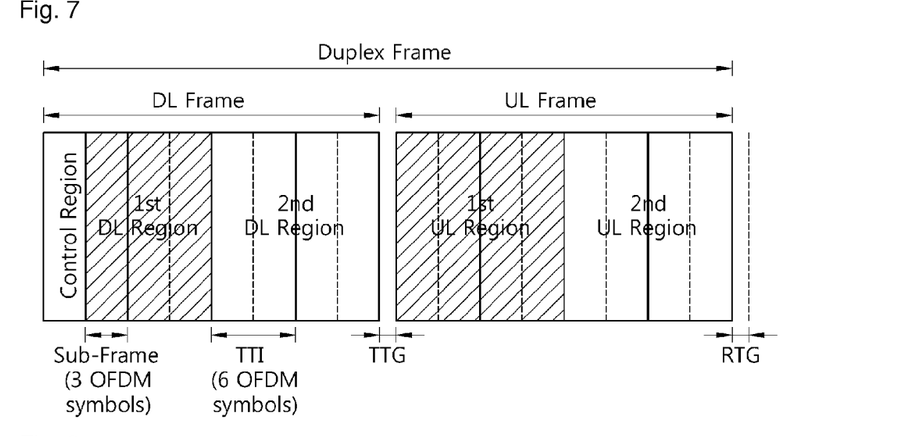
FIG. 7 shows a duplex frame according to an embodiment of the present invention.

FIG. 7 shows a duplex frame according to an embodiment of the present invention. The duplex frame has a structure for the legacy support mode.

Referring to FIG. 7, the duplex frame includes a DL frame and a UL frame. A TDD scheme is used herein in which the DL frame is temporally prior to the UL frame. The DL frame and the UL frame are divided in a sub-frame unit defined as 3 OFDM symbols. The DL frame includes a control region, a r DL region, and a $2^{nd}$ DL region. In the DL frame, the $1^{st}$ DL region is temporally prior to the $2^{nd}$ DL region. The UL frame includes a $1^{st}$ UL region and a $2^{nd}$ UL region. In the UL frame, the $1^{5t}$ UL region is temporally prior to the $2^{nd}$ UL region. Division of the $1^{st}$ DL region and the $2^{nd}$ DL region and division of the $1^{st}$ UL region and the $2^{nd}$ UL region are achieved in the subframe unit.

In the TDD-based duplex frame, the $1^{st}$ DL region and the $1^{st}$ UL region (or the $2^{nd}$ DL region and the $2^{nd}$ UL region) may be temporally divided. Herein, the $2^{nd}$ DL region is assigned to a posterior portion of the DL frame and the $2^{nd}$ UL region is assigned to a posterior portion of the UL frame, and thus the $2^{nd}$ DL region and the $2^{nd}$ UL region are separated by a length of the $1^{st}$ UL region. In this case, the $2^{nd}$ DL region and the $2^{nd}$ UL region may be assigned by being separated in consideration of a data processing time. That is, in the duplex frame, the $1^{st}$ DL region and the $1^{st}$ UL region (or the $2^{nd}$ DL region and the $2^{nd}$ UL region) may be assigned by being separated by a length of the data processing time.

Herein, the TTI has a size of 6 OFDM symbols, that is, a size of 2 sub-frames. As a basic scheduling unit or a radio resource allocation unit, the TTI can be defined as a multiple of the number of sub-frames. In the duplex frame, the TTI may have a various size, and a suitable-sized TTI may be defined as a default TTI as described above. To determine a suitable granularity of the TTI, a data latency, an overhead caused by control signaling, etc., have to be taken into account.

The data latency is defined as a time required for processing and transmitting data. The data latency is significantly affected by a TTI configuration. For example, according to the TTI configuration, a delay time of a hybrid automatic repeat request (HARQ) process may be increased and thus the data latency may also be increased. In general, the less the TTI, the better the system performance for the data latency.

Table 2 shows an example of a data latency according to a TTI configuration in a TDD-based frame. Table 3 shows an example of a data latency according to a TTI configuration in an FDD-based frame. A data latency and a round trip time (RTT) of HARQ are shown herein when a TTI consists of 3 OFDM symbols (i.e., 1 sub-frame), 6 OFDM symbols (i.e., 2 sub-frames), and 12 OFDM symbols (i.e., 4 sub-frames) with respect to the case where the data latency Tp is 1 ms, 2 ms, and 3 ms. In the TDD scheme, a ratio of a DL region and a UL region is 2:1.

TABLE 2

| Latency and RTT | Reference System (IEEE 802.16e) | 3 OFDM symbols/TTI | 6 OFDM symbols/TTI | 12 OFDM symbols/TTI |
| --- | --- | --- | --- | --- |
| Downlink(ms) (Tp: 1 ms/2 ms/3 ms) | 5.417/6.167/6.167 | 1.353/1.934/2.712 | 1.675/2.650/3.250 | 2.875/3.750/5.000 |
| Uplink(ms) (Tp: 1 ms/2 ms/3 ms) | 5.667/5.667/5.667 | 1.484/1.719/3.000 | 1.750/2.875/3.313 | 2.375/3.875/4.25 |
| DL MAX RTT(TTI) | 9/11/11 | 16/26/32 | 8/15/17 | 7/9/12 |
| DL MIN RTT(TTI) | 8/9/9 | 10/16/22 | 6/10/12 | 4/6/10 |

TABLE 3

| Latency and RTT | 3 OFDM symbols/TTI | 6 OFDM symbols/TTI | 12 OFDM symbols/TTI |
| --- | --- | --- | --- |
| Downlink(ms) (Tp: 1 ms/2 ms/3 ms) | 1.156/1.719/2.281 | 1.563/2.312/5.188 | 2.375/3.125/3.875 |
| Uplink(ms)(Tp: 1 ms/2 ms/3 ms) | 1.156/1.719/2.281 | 1.563/2.312/5.188 | 2.375/3.125/3.875 |
| DL RTT(TTI) | 10/16/22 | 6/10/12 | 4/6/8 |

This result is obtained through experiments on a latency from transmission of initial downlink data to transmission of an ACK/NACK signal, a latency from transmission of the ACK/NACK signal to retransmission of data, and a latency from retransmission of data to reception of the retransmitted data. It is assumed herein that information on resource allocation is included in each downlink sub-frame, an ACK/NACK signal is transmitted for each sub-frame, a maximum retransmission number is 1 with a retransmission rate of 30%, and a processing time for generating the ACK/NACK signal and decoding data in downlink and a processing time for scheduling and decoding the ACK/NACK signal in uplink are 1 to 3 ms. According to the experiment result, the less the TTI length, the less the data latency, thereby more improving system performance.

Table 4 shows a data latency according to a configuration of a DL region and a UL region in a TDD-based frame. Herein, a TTI has a size of 6 OFDM symbols, and a processing time Tp is 3 ms.

TABLE 4

| Latency (ms) | One TTG/ RTG6DL:2UL | One TTG/ RTG5DL:3UL | One TTG/ RTG4DL:4UL | Two TTG/ RTG3DL:1UL:3DL:1UL | Two TTG/ RTG2DL:2UL:2DL:2UL |
|---|---|---|---|---|---|
| Downlink | 3.343 | 3.250 | 3.438 | 3.063 | 2.688 |
| Uplink | 3.343 | 3.313 | 3.344 | 2.688 | 2.688 |

When the frame includes one TTG/RTG, the data latency is approximately 3.3 to 3.5 ms according to a ratio of the DL region and the UL region. When the frame includes two TTGs/RTGs, that is, when the DL region and the UL region are separated by being divided within the frame, the data latency is approximately 2.7 ms, which shows more improved performance. The frame structure having two TTGs/RTGs can be applied when all neighboring cells use the legacy disabled mode with the same TTG/RTG configuration.

There is another factor to be considered to determine a suitable granularity of the TTI. That is, a TTI granularity has to be determined by avoiding an unnecessary overhead caused by control signaling while satisfying a backward compatibility with the $1^{st}$ system in a duplex frame structure for the $2^{nd}$ system. In the duplex frame, control information on the $2^{nd}$ system may be additionally included in control information on $1^{st}$ system. The control information on the $2^{nd}$ system may be transmitted through a common control channel and a dedicated control channel. The common control channel may be assigned to a control region of the duplex frame. System control information is broadcast through the common control channel. The system control information represents information on a TTI configuration or information on the dedicated control channel. The dedicated control channel may be assigned to each TTI. Radio resource allocation information on the $2^{nd}$ system is transmitted through the dedicated control channel.

Table 5 shows an example of an overhead caused by control signaling according to various TTI configurations.

TABLE 5

|  | Reference System | 3 OFDM symbols/ TTI | 6 OFDM symbols/ TTI | 12 OFDM symbols/ TTI |
|---|---|---|---|---|
| # of DL TTIs | 1 | 10 | 5 | 3 |
| # of UL TTIs | 1 | 6 | 3 | 1 |
| # of dedicated control blocks | 3 | 10 | 5 | 3 |
| Common control (byte) | 30 | 44 | 34 | 30 |
| Dedicated control (byte) | 429 | 468 | 440 | 429 |
| Req. subcarriers per byte (Common control) | 48 | 48 | 48 | 48 |
| Req. subcarriers per byte (Dedicated control) | 6.47 | 4.61 | 4.79 | 6.47 |
| Total required subcarriers | 4216 | 4269 | 3740 | 4216 |

In the $1^{st}$ system (i.e., reference system), the number of blocks of the dedicated control channel is 3 per one frame. On the other hand, in the $2^{nd}$ system, the number of blocks of the dedicated control channel is determined to be 1 per TTI. Fixed modulation and coding schemes (MCS) are used for the common control channel, and the number of required subcarriers is 48. In case of the dedicated control channel, a different MCS is used according to a location of a UE, and thus the number of required subcarriers may vary. When the number of total required subcarriers is compared with respect to the common control channel and the dedicated control channel, a minimum overhead occurs when a TTI granularity is set to a size of 6 OFDM symbols. A suitable TTI granularity may be set to a size of 6 OFDM symbols.

As such, the duplex frame can be configured by determining 6 OFDM symbols (i.e., 2 sub-frames) as a default TTI in consideration of a data latency and an overhead caused by control signaling. In addition, a partial TTI, a multi TTI, etc., for various-sized data may be assigned to the duplex frame according to the default TTI.

Figure 8:
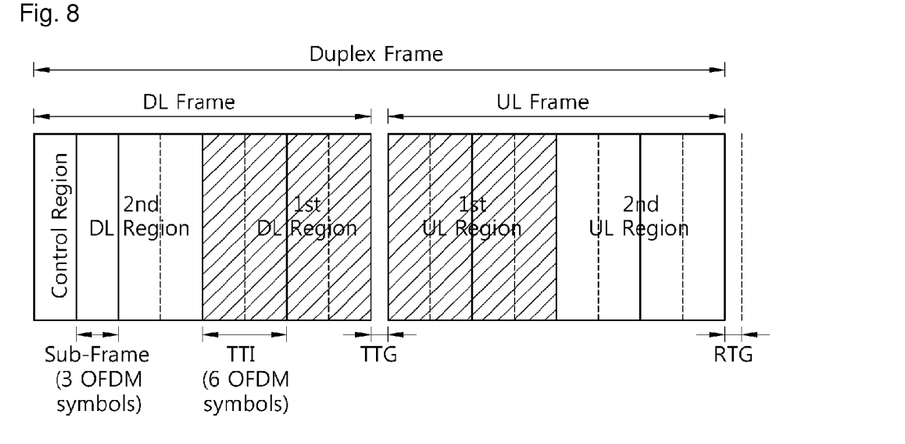
FIG. 8 shows a duplex frame according to another embodiment of the present invention.

FIG. 8 shows a duplex frame according to another embodiment of the present invention.

Comparing with FIG. 7, FIG. 8 shows a case where a $2^{nd}$ DL region is temporally prior to a $1^{st}$ DL region in a DL frame.

A data latency may be affected according to assignment of a DL region and a UL region in a TDD-based duplex frame. If the duplex frame has a size of 5 ms and a data processing time is 1 to 3 ms, the duplex frame has a structure in which the $2^{nd}$ DL region a the $2^{nd}$ UL region are assigned by being more separated than FIG. 7, thereby reducing a data latency with respect to the $2^{nd}$ system. In the duplex frame, it is preferable to assign the $1^{st}$ DL region and a $1^{st}$ UL region (or the $2^{nd}$ DL region and the $2^{nd}$ UL region) by considering the data processing time.

In addition thereto, the $1^{st}$ DL region may be temporally prior to the $2^{nd}$ DL region within the DL frame of the duplex frame, and the $2^{nd}$ UL region may be temporally prior to the $1^{st}$ UL region within the UL frame. Further, the $2^{nd}$ DL region may be temporally prior to the $1^{st}$ DL region within the DL frame of the duplex frame, and the $2^{nd}$ UL region may be temporally prior to the r UL region within the UL frame. That is, the $1^{st}$ DL region and the $2^{nd}$ DL region within the DL frame are assigned using a TDM scheme in which any one of the $1^{st}$ and $2^{nd}$ DL regions is temporally prior to the other region, and the $1^{st}$ UL region and the $2^{nd}$ UL region within the UL frame may be assigned in the same temporal order as the DL frame or in a reverse temporal order of the DL frame.

It has been described above that the duplex frame is configured with a ⅛ CP length and 48 OFDM symbols, and thus the default TTI is defined as 2 sub-frames (i.e., 2 sub-frames per TTI). However, the default TTI may be defined as one sub-frame (i.e., 1 sub-frame per TTI) or four sub-frames (i.e., 4 sub-frames per TTI), and thus the partial TTI or the multi TTI may be differently defined. Although it has been described that a ratio of sub-frames included in the DL frame and the UL frame in the duplex frame is 8:8, there is no limit in the ratio of the sub-frames included in the DL frame and the UL frame. Thus, the duplex frame can be configured in a sub-frame unit with a variety of ratios. The number of OFDM symbols and the CP length used in the duplex frame are not limited to the above description. Thus, the duplex frame may be configured with a 1/16 CP length and 51 OFDM symbols, and various modification may be made therein.

Figure 9:
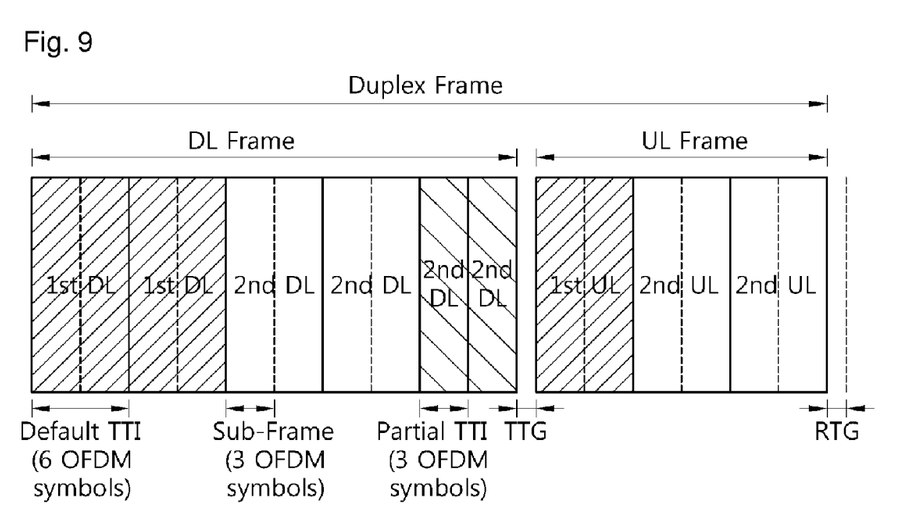
FIG. 9 shows a duplex frame according to another embodiment of the present invention.

FIG. 9 shows a duplex frame according to another embodiment of the present invention.

Referring to FIG. 9, the duplex frame consists of a DL frame including 10 subframes and a UL frame including 6 sub-frames. A $1^{st}$ DL region and a $2^{nd}$ DL region are included in the DL frame. When a default TTI is defined as 6 OFDM symbols, a partial TTI having a size of 3 OFDM symbols is included in the $2^{nd}$ DL region. The partial TTI is assigned to a temporally last portion of the DL frame. The partial TTI may be assigned for transmission of small-sized data such as a voice packet of a VoIP service.

Although it is described herein that the partial TTI is used in the $2^{nd}$ DL region, a multi TTI may be assigned in addition to the partial TTI, and a modified TTI may be used in any position within the duplex frame, such as the $1^{st}$ DL region, a $1^{st}$ UL region, a $2^{nd}$ UL region, etc. For example, when an ACK/NACK signal is transmitted by a $2^{nd}$ UE in uplink, the partial TTI is assigned to the $2^{nd}$ UL region so that the $2^{nd}$ UE effectively transmits the ACK/NACK signal through the partial TTI. A common control channel may be assigned to the duplex frame so that the UE is informed with information regarding a region using the partial TTI and a position of the partial TTI. In addition, a dedicated control channel may be assigned to each TTI of the duplex frame so that the UE is informed with information regarding an allocated resource region.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for transmitting data in a wireless communication system, the method comprising:
    transmitting first data through a radio resource allocated in a unit of a default transmission time interval (TTI) comprising at least one sub-frame in a frame comprising a plurality of sub-frames consisting of a plurality of orthogonal frequency division multiplexing (OFDM) symbols; and
    transmitting second data through a radio resource allocated in a unit of a modified TTI obtained by changing the number of sub-frames included in the default TTI in the frame,
    wherein the frame comprises a downlink frame and an uplink frame, and the default TTI is temporally prior to the modified TTI in the downlink frame or the uplink frame.

2. The method of claim 1, wherein a size of the modified TTI is 1/n of a size of the default TTI, and the number of TTIs included in the frame is an integer multiple of n, where n is an integer satisfying n>1.

3. The method of claim 1, wherein the modified TTI has a size which is m times higher than a size of the default TTI, where m is an integer satisfying m>1.

4. The method of claim 1, wherein the frame comprises a control region, and configuration information about the default TTI and the modified TTI is transmitted through the control region.

5. The method of claim 1, wherein the modified TTI is assigned within a specific region pre-designated for the modified TTI in the frame.

6. The method of claim 5, wherein a position of the specific region pre-designated for the modified TTI and configuration information of the modified TTI are transmitted through a control channel.

7. The method of claim 1, wherein the frame comprises a first region for a first system and a second region for a second system having a backward compatibility for the first system, and the modified TTI is assigned to at least one of the first region and the second region.

8. A method for transmitting data in a wireless communication system, the method comprising:
    transmitting first data through a first region assigned within a frame for a first system; and
    transmitting second data through a second region assigned within the frame for a second system, wherein a various-sized TTI that is a basic unit of scheduling is assigned to at least one of the first region and the second region,
    wherein the frame comprises a downlink frame and an uplink frame, the first region and the second region within the downlink frame are assigned using a time division multiplexing (TDM) scheme in which any one of the first and second regions is temporally prior to the other region, and the first region and the second region within the uplink frame are assigned in the same temporal order as the downlink frame.

9. The method of claim 8, wherein the TTI is configured in a sub-frame unit comprising a plurality of OFDM symbols.

10. A method for transmitting data in a wireless communication system, the method comprising:
    transmitting first data through a first region assigned within a frame for a first system; and
    transmitting second data through a second region assigned within the frame for a second system, wherein a various-sized TTI that is a basic unit of scheduling is assigned to at least one of the first region and the second region,
    wherein the frame comprises a downlink frame and an uplink frame, the first region and the second region within the downlink frame are assigned using a TDM scheme in which any one of the first and second regions is temporally prior to the other region, and the first region and the second region within the uplink frame are assigned in a reverse temporal order of the downlink frame.

* * * * *